Sept. 5, 1967 L. G. SIMJIAN 3,339,671
ARTICLE DELIVERY SYSTEM WITH CODED CHECK CONTROLLED ANNUNCIATOR
Filed Feb. 23, 1966 6 Sheets-Sheet 1

INVENTOR.
Luther G. Simjian
BY
Ervin B. Steinberg
AGENT.

Sept. 5, 1967 L. G. SIMJIAN 3,339,671
ARTICLE DELIVERY SYSTEM WITH CODED CHECK CONTROLLED ANNUNCIATOR
Filed Feb. 23, 1966 6 Sheets-Sheet 6

Luther G. Simjian
*INVENTOR.*

BY
Ervin B. Steinberg
AGENT.

United States Patent Office 3,339,671
Patented Sept. 5, 1967

3,339,671
ARTICLE DELIVERY SYSTEM WITH CODED CHECK CONTROLLED ANNUNCIATOR
Luther G. Simjian, Greenwich, Conn., assignor to General Research, Inc., Greenwich, Conn., a corporation of Connecticut
Filed Feb. 23, 1966, Ser. No. 529,556
8 Claims. (Cl. 186—1)

ABSTRACT OF THE DISCLOSURE

An article delivery system comprising a plurality of article receiving platforms, each adapted to receive a check means having an identifying code which, in the manual delivery mode, is displayed to an order filling side. For automatic article delivery, conveying means receive the article to be delivered together with an identifying check means. Responsive to a match between the identifying check means associated with the article and that disposed at a respective platform, the article is delivered to the particular platform.

This invention refers generally to an article delivery system and concerns, more particularly, an article delivery system which employs a plurality of individual articles receiving positions operative in conjunction with check means for determining the position at which such delivery occurs. This invention is related also to my earlier U.S. Patent No. 3,130,395, dated Apr. 21, 1964 entitled "Service Area With Compartments" and my copending application for U.S. Letters Patent Ser. No. 466,705, filed June 24, 1965 entitled "Service Compartment," now Patent No. 3,300,016 both of which disclose individual compartments equipped with keying means.

The article delivery system described hereafter is particularly suited for food service at drive-in restaurants and supermarkets, but it shall be clearly understood that the same or a slightly modified principle may be used also for the delivery of ordered goods at a department store, a dry-cleaning establishment, etc. to name but a few of the many applications.

In a broad sense, the present invention includes a plurality of article receiving positions which conventionally may be arranged in side-by-side relation. The customer by means of a ticket or other check means orders articles for delivery and pays for such articles, the method of payment does not form, however, a part of this disclosure. The customer holding a check means, such as the stub of the original ticket, uses this check means to control the delivery of the ordered article, specifically, the receiving position at which such delivery occurs. The method of delivery may be a manual one, or in an alternative embodiment is automated by the combination and interrelation of various instrumentalities which will be described.

One of the principal object of this invention is, therefore, the provision of a new and improved article delivery system.

Another important object of this invention is the provision of a novel article delivery system which includes a plurality of article receiving positions and includes means to provide for the receipt of articles in response to check means deposited at such an article receiving position.

Another important object of this invention is the provision of a means for causing a check means which is deposited to control the delivery of an article to be rendered inaccessible for surreptitious removal subsequent to the delivery of such article.

A further object of this invention is the provision of a plurality of receiving positions, each including a check acceptance means and an article receiving means, whereby the check means deposited in the acceptance means co- operates with certain control means to provide for the proper article to be received at such position.

Other and still further objects of this invention will be more clearly apparent by reference to the following description when taken in conjunction with the accompanying drawings in which:

Figures 1, 3:
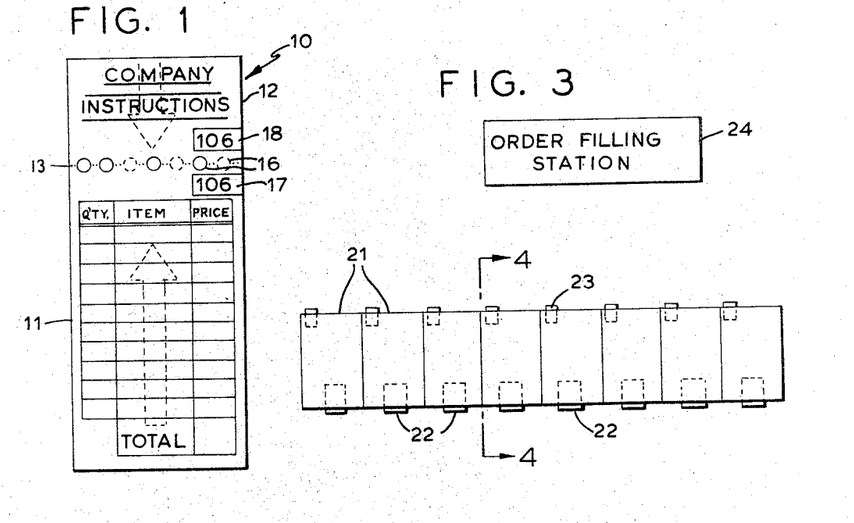
FIGURE 1 is a top plan view of a typical check means, such as a ticket and stub forming a part thereof, which may be used in conjunction with the present invention.
FIGURE 3 is a top plan view of a typical article delivery system per the present invention.
Figures 2, 4:
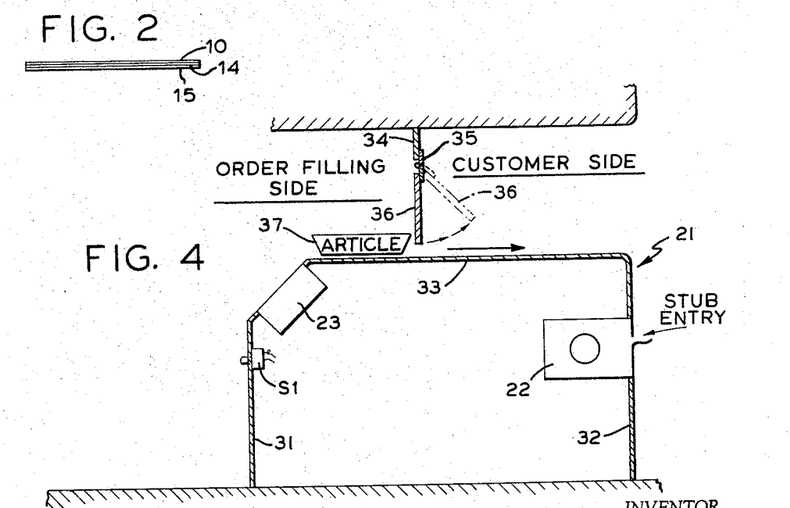
FIGURE 2 is a side view of FIGURE 1.
FIGURE 4 is a sectional view along lines 4—4 in FIGURE 3.

Referring now to the figures and FIGURES 1 and 2 in in particular, numeral 10 refers to an ordering ticket which has a lower ordering portion 11 and a separable upper stub 12 which may be detached at a perforated line 13. This ticket 10 may be fabricated from card stock or cardboard and each such ticket may be made as a package which comprises the ticket 10, an underlying carbon paper 14 and a tissue paper record copy 15 as seen in FIGURE 2. This package is similar to charge tickets used quite conventionally with gasoline credit cards. Alternatively, the carbon paper 14 may be deleted when pressure sensitive copy paper is used.

Each ticket is provided with a quantity column, an item column, a price column and such other printed information as is deemed necessary or desirable. Also, the main ticket portion and the stub portion are provided with arrows which show the direction for subsequently inserting these portions, properly oriented, in sensing means which will be described later. Along the perforated line 13, the ticket 10 is provided with a plurality of binary positions 16, the absence of a perforation signifying a binary "zero" and the presence of a perforation signifying a binary "one." As shown in FIGURE 1, there are, for illustrative purposes, seven binary positions 16. Also, as seen, the binary positions "2," "8," "32," and "64" are punched out, while the positions "1," "4," and "16" are left un-punched. Thus, a number "106" is developed which is indicated in standard decimal notation on the main body of the ticket, reference numeral 17, and on the stub, numeral 18. Therefore, the ticket is identified by the number "106." The binary perforations are used in conjunction with electrical switches or photoelectric means and a relay network also known as a "relay tree" to provide a decimal output which is adapted to serve as a visual display.

A patron fills out the ticket by noting his selections, such as several items which constitute a snack, and then presents the ticket to a cashier who collects the proper amount of money and returns the stub 12 to the patron. The cashier separates the ticket package, retaining the tissue copy 15, and passes the main ticket portion 11 to an order filling station. The ticket and stub portions, when presented to the cashier may be provided with a date and a time stamp to provide still further identification and validation. Also, the ticket 10 may be constructed to operate in conjunction with an automatic computing means as is described in my copending application for U.S. Letters Patent Ser. No. 470,779, filed July 9, 1965, entitled "Computing and Recording System."

The ticket thus prepared is used in conjunction with the article receiving positions shown in FIGURE 3 wherein the numeral 21 identifies a plurality of article receiving positions, each such position being provided respectively with a check acceptance means 22 and an indicia display means 23. The patron selects an available position 21 and deposits his ticket stub 12 in the associated check acceptance means 22. The identifying stub number 18 is displayed by the associated display means 23.

The main ticket portion 11 meanwhile has been transferred to the order filling station 24 where the order is filled. When the order is complete and suitably placed on a tray, an attendant, in the manual mode of operation, delivers the tray with the articles to the receiving position 21 whose display means 23 displays the identifying number of the stub which coincides with the number of the main ticket portion 11 transferred to the station 24 for filling the order. Preferably, the ticket portion 11 is placed on the tray together with the order for return to the patron so as to assure identification of the delivered article or articles.

FIGURE 4 shows the construction of an article receiving position 21 which includes a frame comprising two vertical panels 31 and 32 and a horizontal article receiving platform 33. A barrier 34 divides the order filling side containing the order filling station 24 from the customer's side. The barrier is provided with a hinge 35 to support a swinging panel 36. As seen in FIGURE 4, an article 37 has been deposited on the platform 33 and is about to be pushed toward the customer's side, causing the panel 36 to temporarily swing toward the right, indicated by the dashed lines. Movement of the panel 36 may be controlled manually or automatically, as for instance by a tripping switch or a photoelectric control means.

Each article receiving position 21, as shown in FIGURES 3 and 4, is provided with a check acceptance means 22 into which the customer inserts his stub 12. The identifying number of the stub is decoded and displayed on the front panel of the display means 23. This display means, in its simplest embodiment comprises a standard annunciator panel. The attendant places the respective order on the platform 33, pushes the article 37 underneath the barrier 34 toward the customer's side and then operates push button control switch S1 which cancels the display on the display means 23 and also renders the stub inserted into the check acceptance means 22 inaccessible for withdrawal by the customer. In an alternative embodiment, the switch S1 is mounted on the platform 33 to be actuated by the deposit of an article 37 thereupon. In this manner the display is cancelled fully automatically and the stub is rendered inaccessible for surreptitious removal responsive to the delivery of the article.

Instead of the decoding means for the binary code in combination with the annunciator unit, for the purpose of a relatively simple and inexpensive arrangement, direct optical projection of the stub numeral 18 may be accomplished by a standard optical projection means, such as an opaque projector.

Figure 5:
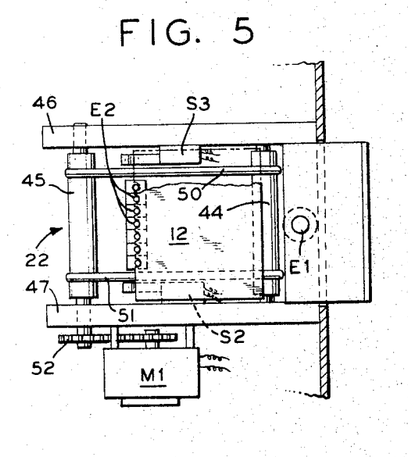
FIGURE 5 is a sectional view of the check acceptance means along lines 5—5 in FIGURE 6.
Figure 6:
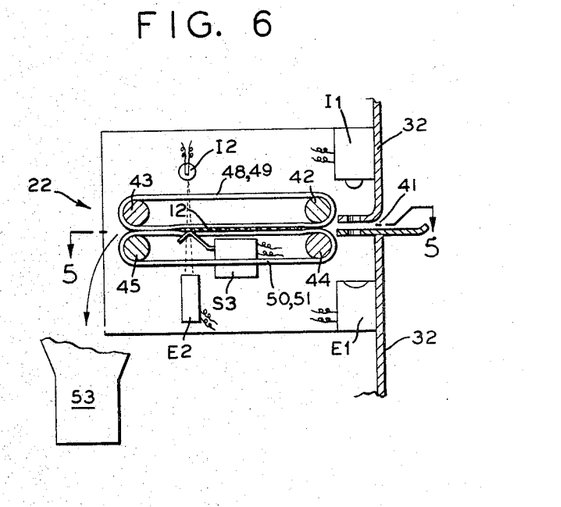
FIGURE 6 is an elevational view, partly in section, of the check acceptance means.

FIGURES 5 and 6 show the detailed construction of the check acceptance means 22. This check acceptance means comprises, as its main parts, an entrance slot 41 for receiving therein the stub 12, two pairs of rollers 42, 43, 44 and 45 which are journalled in the supports 46 and 47. The upper rollers 42, 43 are coupled to one another by a set of endless belts, such as two O-rings 48, 49, and the lower rollers 44 and 45 are coupled to one another by a similar set of O-rings 50 and 51. The roller 45 is coupled to an electric motor M1 via a suitable gearing 52. Since the upper rollers and the lower rollers are in frictional contact with one another, operation of the motor M1 causes rotation of all of the rollers. The rollers and gaskets are so dimensioned that a stub inserted at the entrance slot 41 is carried into the acceptance means, retained therein until the respective article is delivered, and then is discharged into a receptacle 53 from which such stub cannot be removed surreptitiously. The check acceptance means includes, further, a source of illumination I1 and a photoelectric cell E1, disposed at the entrance slot 41, a switch S2 and a switch S3 within the acceptance means, and a plurality of lamps I2 and corresponding photoelectric cells E2, one such lamp and cell being disposed to sense each of the respective binary digit positions 16 of the stub as described in connection with FIGURE 1.

Operation of the acceptance means 22 in conjunction with the display means 23 and the control circuit may be visualized as follows, referring also to FIGURE 7. As the stub is passed through the entrance slot 41, a light beam which normally exists between the lamp I1 and the photoelectric cell E1 is broken. This action causes the time delay relay K1 to be de-energized and the motor M1 to rotate via the now closed contact associated with the relay K1 and the series connected closed switch S2. Hence, the stub 12 is drawn between the rollers 42 and 44 and advanced into the unit. A brief moment thereafter, the leading edge of the stub operates the switch S2, opening this switch, thus stopping the motor M1. At this moment, the binary codings 16 of the stub 12 are in alignment with the plurality of lamps I2 and the photoelectric cells E2. The upper contact of switch S2 energizes the decoding unit 55, a relay tree, which receives the binary input signals from the plurality of photoelectric cells E2 and provides a decimal output signal to the display means 23. When the article 37 has been delivered to the platform 33 and the switch S1 is actuated, either manually or automatically, the motor M1 is re-activated and the relay K2 is energized. This relay in conjunction with the feed switch S3 clears the stub from the acceptance means 22, the stub being discharged into the receptacle 53 which is disposed so as to be inaccessible for surreptitious removal from the customer's side. Alternatively, a shredder unit may be attached to the rollers 43 and 45 to shred the stub during its ejection from the unit.

Instead of providing an annunciator panel at each station, a central annunciator panel may be provided which displays the stub numeral in association with a respective article receiving position. Alternatively, such a panel may be provided in addition to the individual display units described.

The above arrangement describes the operation of the article delivery system when the manual mode of article delivery is employed.

An alternative embodiment comprises the use of a conveying means for automatically conveying the article to the article receiving position which has been selected by the customer. In this automatic mode of operation, the customer, as described previously, deposits the stub 12 in one of the check acceptance means 22 while the ticket portion 11 together with the article is placed on a conveying means and conveyed thereby past the several receiving position 21. Control means, upon determining the existence of correlation between the stub portion 12 and the main ticket portion 11, causes the article 37 to be conveyed from the conveying means to the respective position 21. The receiving positions form sidings of the conveying means.

Figure 7:
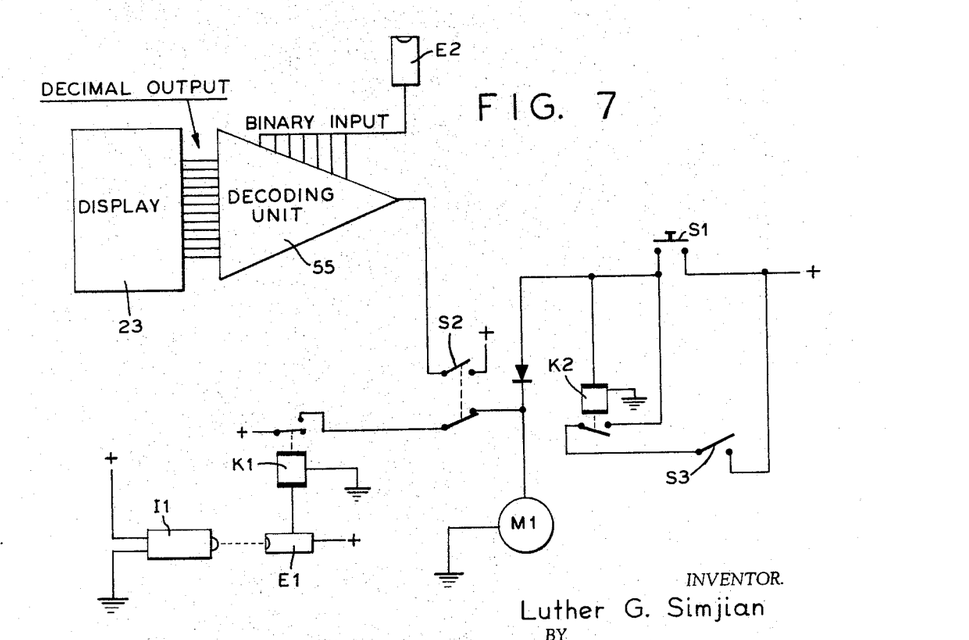
FIGURE 7 is a schematic electrical circuit diagram showing the interconnection of the various electrical components and of the control circuit for operating the above described embodiment of the invention.
Figure 8:
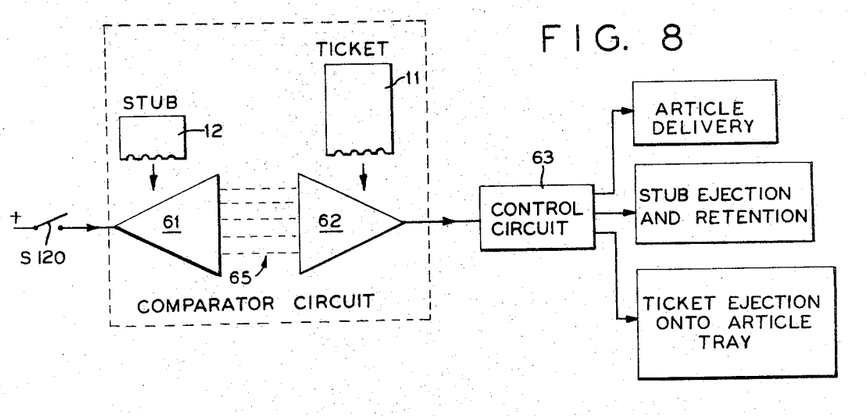
FIGURE 8 is a schematic block diagram of an alternative arrangement of my invention when an automatic conveying means is used for article delivery.

The schematic block diagram of this embodiment is shown in FIGURE 8. The ticket stub 12 is inserted in a selected acceptance means 22 of an article receiving position 21 which is provided with a sensing unit 61 to decode the binary coding of the stub. The ticket portion 11 which is associated with the article is placed by the attendant preparing the order in a ticket identifying unit 62 which is associated physically with the conveyor section carrying the order. The ordered article with ticket 11 is conveyed by the conveying means past the positions 21. When correspondence of the binary coding between the ticket and the stub is established, an output signal is generated to the control circuit 63 which, in turn, causes the article to be conveyed from the conveying means to the respective article receiving position 21 and, simultaneously, causes the stub 12 to be ejected from the check acceptance means 22 and rendered inaccessible for surreptitious removal. Also, the ticket 11 is ejected from the identifying unit and delivered with the article. The sensing unit 61 and the unit 62, in one embodiment, comprise respective panels and relay trees as described in connection with the unit 55 (FIGURE 7), both units 61 and 62 being connected to one another to form a comparator circuit. Interconnection between both units is accomplished by light beams 65. Upon the occurrence of coincidence an output signal is provided to the control circuit 63.

The control circuit, which includes a single one-revolution clutch to be described later, causes the article to be transferred from the conveying means to the respective article receiving position. Moreover, the stub is ejected from the check acceptance means as described before, and the ticket which rides along the conveying means in the ticket identifying unit is ejected upon the tray having the articles. The ticket identifying unit is substantially identical in construction with that of the check acceptance means 22.

Alternatively, the ticket and stub sensing units may comprise standard optical character scanners and decoding means as are shown for instance in U.S. Patents No. 2,896,763 to D. G. Gisser et al., dated July 28, 1959; No. 2,552,156 to H. De France dated May 8, 1951; or No. 2,663,758 and No. 2,897,481 both issued to D. H. Shepard and dated respectively Dec. 22, 1953 and July 28, 1959. Moreover, magnetically coded check means may be employed in conjunction with decoding units and a coincidence circuit, all as are known to those skilled in the art.

Figures 9, 10:
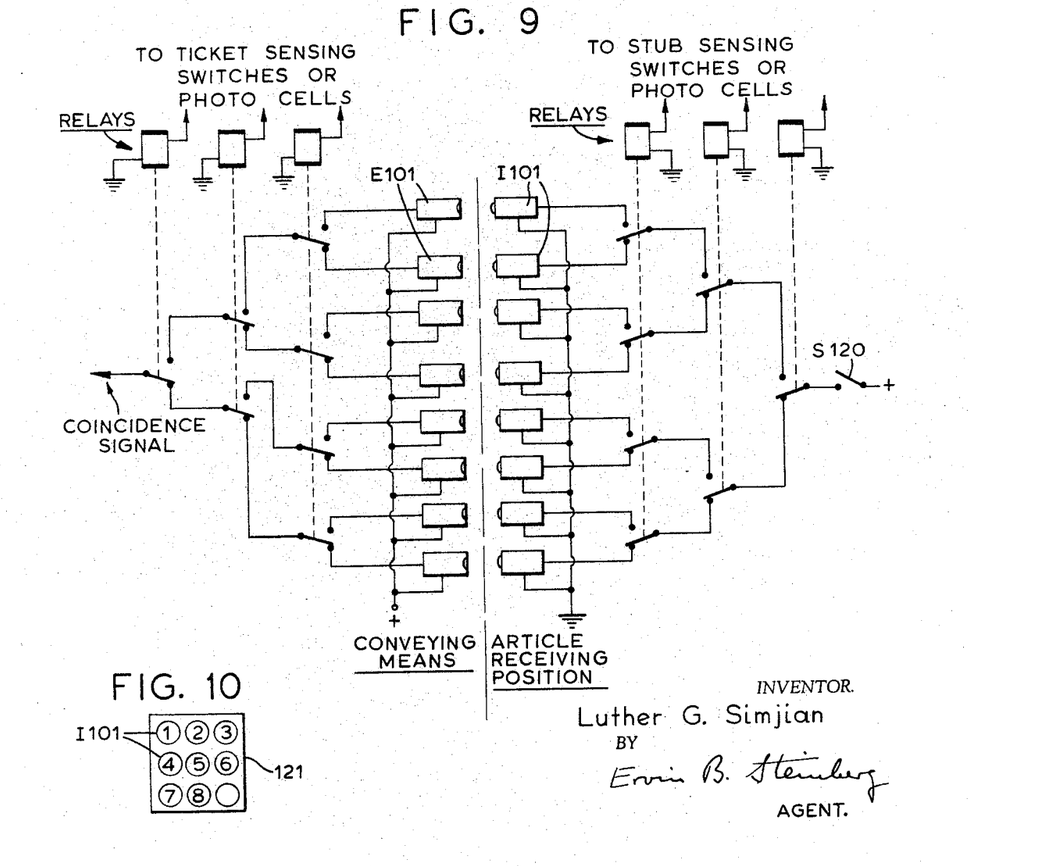
FIGURE 9 is a schematic electrical circuit diagram of the comparator circuit per FIGURE 8.
FIGURE 10 is a plan view of the front panel of the display means.

FIGURE 9 is an elaboration of the specific comparator circuit shown as a part of the block diagram of FIGURE 8. For illustrative purposes a three-digit binary input is shown for both the ticket portion and the stub to provide a total of eight outputs. The output of the stub decoder is an array of miniature lamps I101. As described previously in connection with FIGURES 4 and 7, these lamps are contained in the display unit 23 and are arranged in a housing having a transparent front panel 121 as indicated in FIGURE 10. Depending upon the stub number 18, a corresponding lamp I101 is energized.

An output panel, sensitized responsive to the number 17 of the ticket portion 11, accompanies the article tray as such a tray is carried by a section of the conveying means. This output panel is essentially a mechanical duplicate of the display panel 121, FIGURE 10, but is provided with photoelectric cells E101, instead of lamps, so that as the output panel is carried by the conveying means it comes into and out of mechanical alignment with a respective display unit, providing for a brief alignment, or registration, of respective lamps and photocells. When a conveyor section carrying an article tray is in register with an article receiving position 21, a synchronizing switch S120, see also FIGURE 8, is closed by the conveyor. A voltage from switch S120 illuminates one of the lamps I101 of the display means, the lamp illumination being responsive to the coded numeral of the stub as sensed by switches or photocells. If the numeral on the stub matches the numeral on the ticket, then a light from one of the lamps I101 strikes a matching sensitized photocell E101, thus providing an output signal which appears as a coincidence signal to cause the various control functions indicated in FIGURE 8. As mentioned heretofore, the above sensing and comparator circuit is merely illustrative of a variety of code or character reading and comparator circuits which may be used in conjunction with this particular application.

Figure 11A:
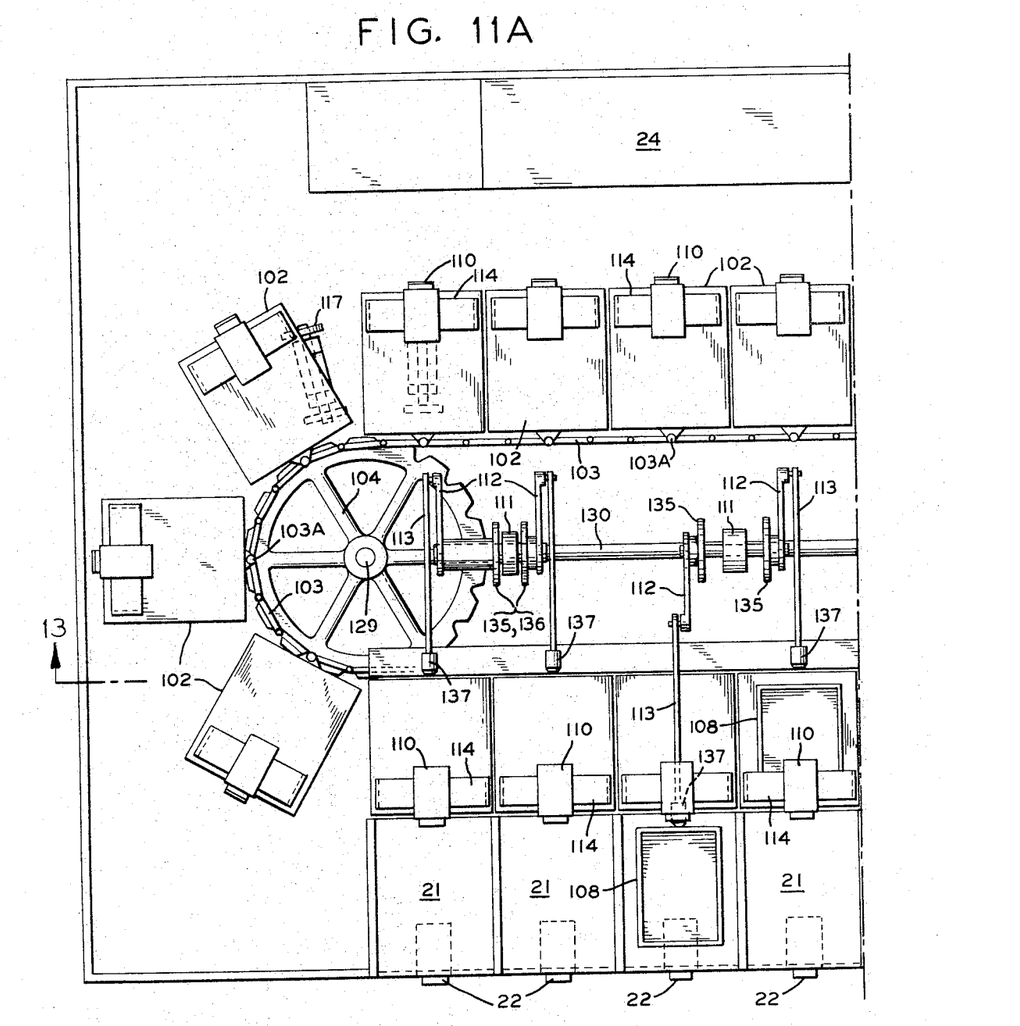
FIGURE 11 is a top plan view of the article delivery system using automatic conveying means.
Figure 11B:
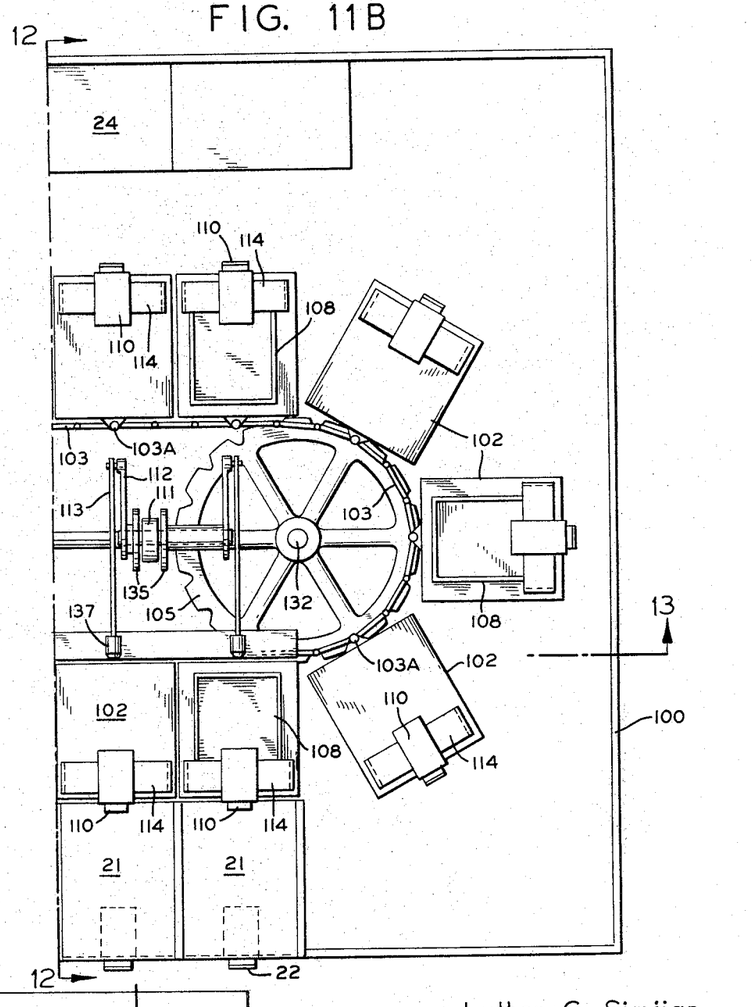

Referring now to the mechanical embodiment of the alternative mode which uses automatic article delivery means, employing a controlled conveying means and FIGURE 11 in particular, there is shown an enclosure 100 which contains among other parts a conveying means having eighteen articulate sections 102 and an endless chain 103 which is drawn by a sprocket 104 and an idler sprocket 105. An order filling area 24 is disposed at the rear of the enclosure 100. This area is similar to that in FIGURE 3 and serves for placing articles ordered on the trays 108 for delivery to the customer. At the front of the enclosure are shown six article receiving positions 21. Each such position contains a stub or check acceptance means 22 of the type previously described. Each conveyor section 102 carries a ticket identification and delivery unit 110 which is similar to the check acceptance means 22 described heretofore and the electrical circuit shown in FIGURE 9. Arranged in the center of the conveying means are stanchions 111 which support the crank arms 112 and associated delivery plungers 113. At the third position 21 from the left, a crank arm 112 and a plunger 113 are shown in the extended position, having just delivered a tray 108 to the respective position and about ready for resuming the normally retracted position.

Figure 12:
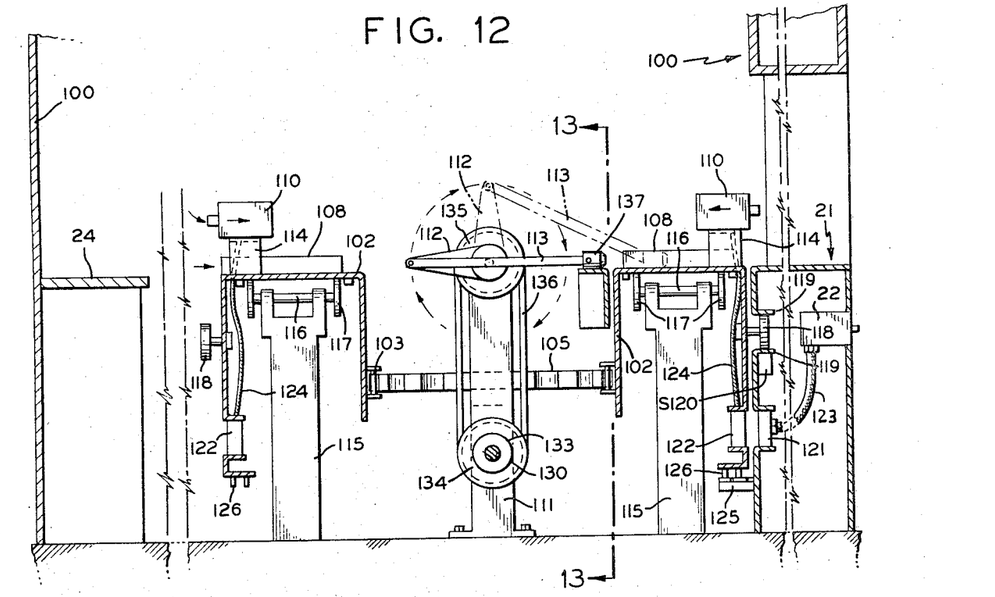
FIGURE 12 is a sectional view along lines 12—12 in FIGURE 11.

Referring now also to FIGURE 12, the U-shaped cross section of the respective conveyor sections 102 is evident. Each section is adapted to receive and carry a tray 108. Also shown is the ticket identification unit 110 mounted on a bracket 114 which is fastened to the respective conveyor section. As each section comes into register at a respective article receiving position 21, the ticket stub numeral display panel 121 comes into alignment with an opposing panel 122, which is the output panel sensitized to the numeral of the ticket as stated heretofore. The guides 119 engage a wheel 118 attached to the conveying means to ascertain accurate registration of the respective conveyor section with the article receiving station. The display panel 121 and its circuit are coupled to the check acceptance means 22 via a cable 123. The ticket numeral output panel 122 is coupled to the ticket identification unit 110 via a cable 124. The synchronizing switch S120 is disposed for actuation by the wheel 118 attached to the conveying means at the precise moment of mechanical registration between the stub display panel 121 and the ticket responsive panel 122. Closing of the switch applies power to the electrical circuit and when coincidence of the respective numerals exists, the ticket 11 is ejected from the unit 110 onto the tray 108 containing the articles with which the ticket is associated. Also, the tray is moved by means of the plunger 113 from the conveying means on to the position 21 for receipt by the patron.

As the conveyor sections are moved peripherally by the chain 103, the sections ride on rollers 117 affixed to a shaft 116 mounted in the stanchions 115. There is a plurality of these rollers to ensure smooth passage of the article bearing trays. Numeral 125 shows a bracket on which is mounted a set of electrical contact strips to provide electrical energy to the ticket identifying unit 110. The contacts 126 pick of the voltage.

Figure 13:
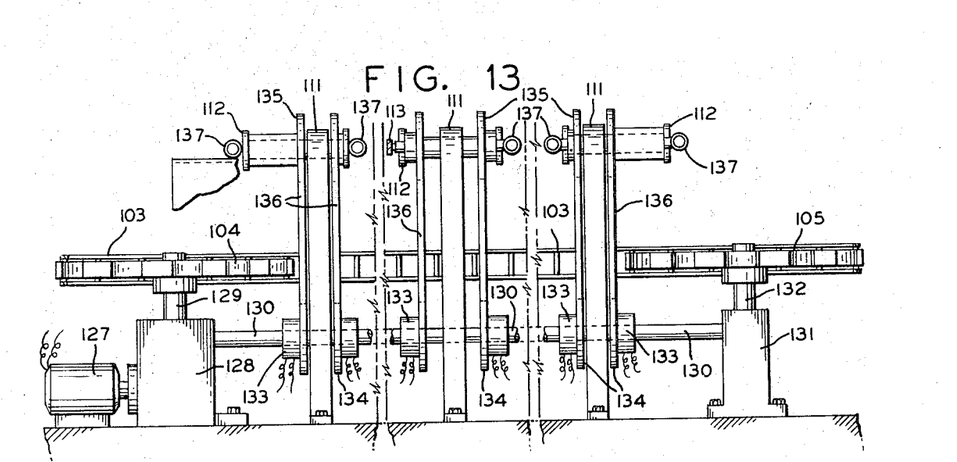
FIGURE 13 is a sectional view along lines 13—13 in FIGURES 11 and 12.
Figure 14:
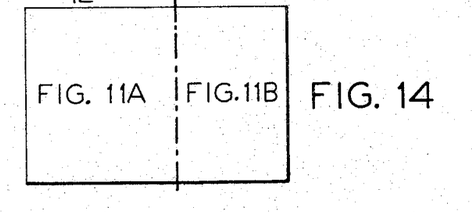
FIGURE 14 is a view showing the arrangement of FIGURE 11.

Referring also to FIGURE 13, the electric motor 127 through a speed reducer 128 drives shafts 129 and 130. A support 131 supports the horizontal shaft 130 and the idler sprocket 105 and the shaft 132. The shaft 129 drives the sprocket 104 which is coupled to the idler sprocket 105 by the endless chain 103. As mentioned heretofore, each conveyor section 102 is attached to this chain by means of a coupling pin 103A.

The shaft 130 which revolves continuously, is supported by the stanchions 111. Located on the shaft 130 are single-revolution clutches 133 connected to sheaves 134 which are coupled to sheaves 135 by corresponding V-belts 136. Each sheave 135 is coupled to a crank arm 112. When the single-revolution clutch is actuated, the sheaves 134 and 135 and the crank 112 complete one revolution cycle, thus causing the arm 113 and the plunger 137 (FIGURE 12) to push the respective tray 108 from the associated conveyor section 102 on to the receiving position 21 which forms a siding. Each stanchion 111 supports a pair of delivery arms for moving trays on an adjacent pair of conveyor sections.

When a respective conveyor section 102 is in register with an article receiving position 21 and coincidence of the identifying numerals occurs, the resulting coincidence signal causes operation of the respective single revolution clutch 133, actuation of the relay K2 in the stub acceptance means control circuit, FIGURE 7, and operation of the corresponding relay in the associated ticket identifying means 110, thus providing for the respective ejection of the stub into the receptacle 53, FIGURE 6, and for the ejection of the ticket from the unit 110 on to the tray 108. In the absence of a coincidence signal, the tray with its articles is maintained on the conveying means and is passed consecutively to the various article receiving positions until either a match between the ticket and stub is found or the tray is removed from the conveying means.

As a further extension of the principle described heretofore, the article filling station 24 may be automated and combined with the ticket sensing and computing means of my copending application for U.S. Letters Patent Ser. No. 470,719 supra in such a way as to cause selected articles to be released from storage bins and assembled on a tray 108 in response to order signals from the ticket. In this manner, the article filling station is automated also. The order filling station may either comprise a separate station with the trays passing and filled trays being conveyed to the conveying means shown or, alternatively, an extra length of the conveying means may be provided on which the trays pass past storage bins from which selected articles are ejected and placed on the tray prior to the filled tray being conveyed past the various receiving positions 21.

The check means as used in the above described arrangement serves for associating an article with an article receiving position. In order to accomplish this, the check means imparts code designation to the otherwise uncoded article and the receiving position. When correlation of a set of check means is established, the ordered article is matched with the respective receiving position and, hence, with the patron. As stated above, such correlation may be achieved by any suitable means using graphic data and indicia, magnetic information, electrically conductive means, mechanical indexing means, etc. The check retained by the customer, when inserted in a respective article receiving position, codes this position so that the article which has been associated with the related code at the time the order was prepared or filled is delivered at the station so coded.

A still further alternative embodiment comprises the use of independent, powered carrier means instead of the conveying means shown. In this latter construction, each filled tray is placed on a carrier which becomes coded and which delivers such articles to the respective article receiving position. The carrier then returns to the order filling area.

While there has been described and illustrated a preferred embodiment of my invention and several modifications have been indicated, it will be apparent to those skilled in the art that various further changes and modifications may be made therein without departing from the broad principle and intent of this invention which shall be limited only by the scope of the appended claims.

What is claimed is:

1. An article delivery system comprising:

a plurality of article receiving positions, each including a check receiving means for receiving a code bearing check and including means for providing a signal responsive to such code;

a conveying means comprising sections disposed for conveying articles disposed on respective sections to said positions; each of said sections including a check receiving means for receiving a code bearing check and providing a signal responsive to such code;

means coupled to said conveying means for causing said conveying means to consecutively convey said sections past said positions;

means coupled to said respective check receiving means for causing a comparison of said code responsive signals as each section having a code bearing check passes one of said positions and upon determining the existence of correlation of said respective signals causing an output signal;

delivery means coupled to said conveying means and adapted to be actuated responsive to said output signal for causing the article to be conveyed from said conveying means to the respective position whose check code responsive signal correlates with that of the article, and control means coupled to said respective check acceptance means for causing responsive to said output signal the check accepted by said acceptance means associated with said position to be rendered inaccessible for surreptitious removal therefrom, and for causing the check accepted by said check acceptance means associated with said respective article conveying section to be delivered with such article to said position.

2. An article delivery system comprising:

an article receiving platform having an order filling side and a customer side at which a customer receives an ordered article;

a check acceptance means which includes code sensing means accessible from said customer side for receiving a coded check and sensing the code thereon;

display means disposed for being visible from said order filling side;

means coupling said code sensing means to said display means for causing said display means to display indicia responsive to the code on a check as sensed by said code sensing means, and control means coupled to said check acceptance means for causing a received check to be moved out of contact with said code sensing means and become inaccessible from said customer side upon the delivery of an article to the customer side of said platform, whereby to cancel said display and condition said check acceptance means for the receipt of a subsequent check.

3. An article delivery system comprising:

an article receiving platform;

barrier means dividing said platform into an order filling side and a customer side at which the customer receives an ordered article;

a check acceptance means which includes code sensing means accessible from said customer side for receiving a coded check and sensing the code thereon;

display means disposed for being visible from said order filling side;

means coupling said code sensing means to said display means for causing said display means to display indicia responsive to the code on a check as sensed by said code sensing means, and control means coupled to said check acceptance means for causing a received check to be moved out of contact with said code sensing means and become inaccessible from said customer side upon the delivery of an article to the customer isde of said platform, whereby to cancel said display and condition said check acceptance means for the receipt of a subsequent check.

4. An article delivery system as set forth in claim 3, said check acceptance means including transport means for transporting a check to a code sensing position within said acceptance means and subsequently removing the check from said code sensing position and discharging it from said acceptance means.

5. An article delivery system as set forth in claim 4 and including a shredder disposed to receive a check being discharged from said acceptance means and causing mutilation of the check.

6. An article delivery system comprising:
a plurality of article receiving positions, each including a stationary platform and a check receiving means for receiving a code bearing first check and for providing a signal responsive to such code;
a conveyer means comprising sections, each adapted to support a respective tray, disposed for conveying such trays to said positions; each of said sections including a check receiving means for receiving a code bearing second check and providing a signal responsive to such code,
whereby to associate a respective tray with a code bearing check;
means coupled to said conveying means for causing said conveying means to consecutively convey said sections past said positions;
means coupled to said respective check receiving means for causing a comparison of said code responsive signals as each section having a code bearing check passes one of said positions and upon determining the existence of correlation of said respective signals causing an output signal, and
delivery means coupled to said conveying means and adapted to be actuated responsive to said output signal for causing a respective tray to be removed from said conveying means and deposited upon the platform of a respective receiving position whose check code responsive signal correlates with that of the respective tray.

7. An article delivery system as set forth in claim 6 wherein said sections of said conveying means move on an endless track, said article receiving positions are disposed adjacent to said track, and said delivery means are adapted to engage a respective tray and move it from a respective section upon an adjacent respective platform, whereby such tray is removed from said conveying means and delivered to a respective article receiving position.

8. An article delivery system as set forth in claim 7 wherein said conveying means and said delivery means are adapted to respectively convey and move a horizontally disposed tray having articles resting thereupon.

References Cited

UNITED STATES PATENTS

| 1,377,813 | 5/1921 | Dlugach | 186—1 X |
| 1,796,668 | 3/1931 | Sarfaty. | |
| 2,014,599 | 9/1935 | Stedman. | |
| 2,360,241 | 10/1944 | Kuhl | 194—10 X |
| 2,674,203 | 4/1954 | Bellah et al. | 186—1 X |
| 3,126,837 | 3/1964 | Noye et al. | |
| 3,168,053 | 2/1965 | Miroux | 198—38 X |
| 3,241,709 | 3/1966 | Cease | 186—1 X |

FOREIGN PATENTS

| 360,791 | 11/1931 | Great Britain. |
| 83,980 | 7/1954 | Norway. |

SAMUEL F. COLEMAN, *Primary Examiner.*